(12) United States Patent
Ise

(10) Patent No.: US 8,330,853 B2
(45) Date of Patent: Dec. 11, 2012

(54) IMAGE PICKUP APPARATUS THAT CAN REDUCE POWER CONSUMPTION

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/752,819

(22) Filed: Apr. 1, 2010

(65) Prior Publication Data

US 2010/0253803 A1    Oct. 7, 2010

(30) Foreign Application Priority Data

Apr. 7, 2009   (JP) ................................ 2009-093104

(51) Int. Cl.
*H04N 5/225* (2006.01)
(52) U.S. Cl. .................................. 348/372; 348/333.13
(58) Field of Classification Search ............... 348/222.1, 348/372, 333.13
See application file for complete search history.

(56) References Cited

U.S. PATENT DOCUMENTS

| | | | | |
|---|---|---|---|---|
| 7,015,965 | B2* | 3/2006 | Asada et al. .................. | 348/312 |
| 7,411,622 | B2* | 8/2008 | Mitsui et al. .................. | 348/312 |
| 7,557,833 | B2* | 7/2009 | Okawa ........................ | 348/220.1 |
| 2002/0021364 | A1* | 2/2002 | Asada et al. .................. | 348/312 |
| 2007/0035650 | A1* | 2/2007 | Suzuki ......................... | 348/312 |
| 2008/0007643 | A1* | 1/2008 | Okumura .................. | 348/333.01 |
| 2010/0208108 | A1* | 8/2010 | Nakahira ..................... | 348/248 |

FOREIGN PATENT DOCUMENTS

| | | |
|---|---|---|
| CN | 1913593 A | 2/2007 |
| JP | 11-168770 | 6/1999 |

OTHER PUBLICATIONS

The above reference was cited in a Oct. 26, 2011 Chinese Office Action, which is enclosed with English Translation, that issued in Chinese Patent Application No. 201010143018.9.

* cited by examiner

*Primary Examiner* — Jason Chan
*Assistant Examiner* — Gary C Vieaux
(74) *Attorney, Agent, or Firm* — Cowan, Liebowitz & Latman, P.C.

(57) ABSTRACT

An image pickup apparatus that can reduce power consumption of the image pickup apparatus, and take high-definition moving images at high speed without bringing about decreases in recordable time and the number of still images taken. An image pickup processing unit is operated in a plurality of operation modes, and has an image pickup device and a plurality of processing units that process image pickup signals outputted from the image pickup device. An interval control circuit causes the image pickup processing unit to switch between a standby ON state and a standby OFF state in predetermined timing. A control signal is outputted to the interval control unit according to an operation mode of the image pickup processing unit. When the image pickup processing unit lies in a predetermined operation mode, a control signal for causing the interval control circuit to perform the switching is outputted to the interval control circuit.

20 Claims, 8 Drawing Sheets

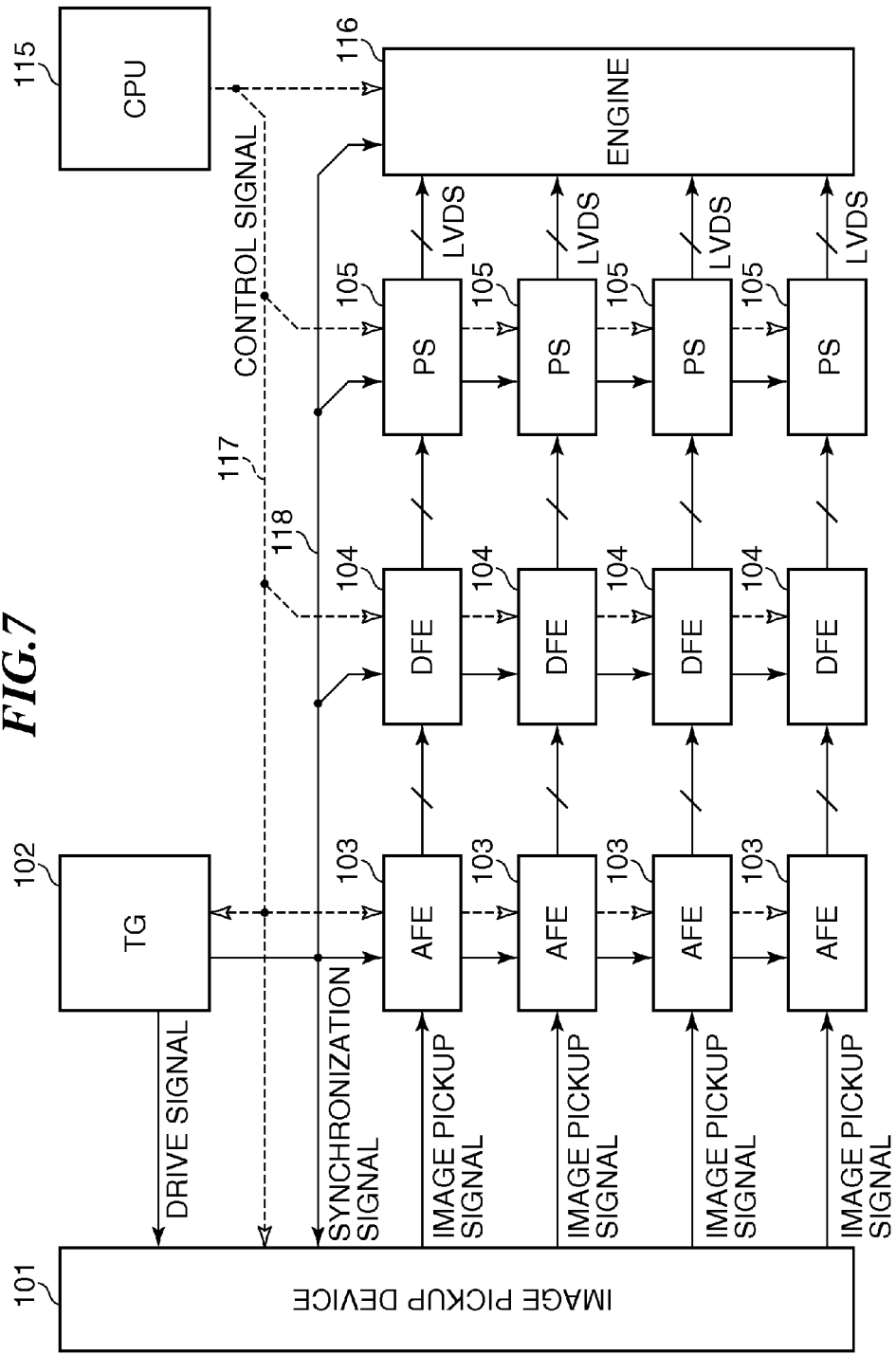

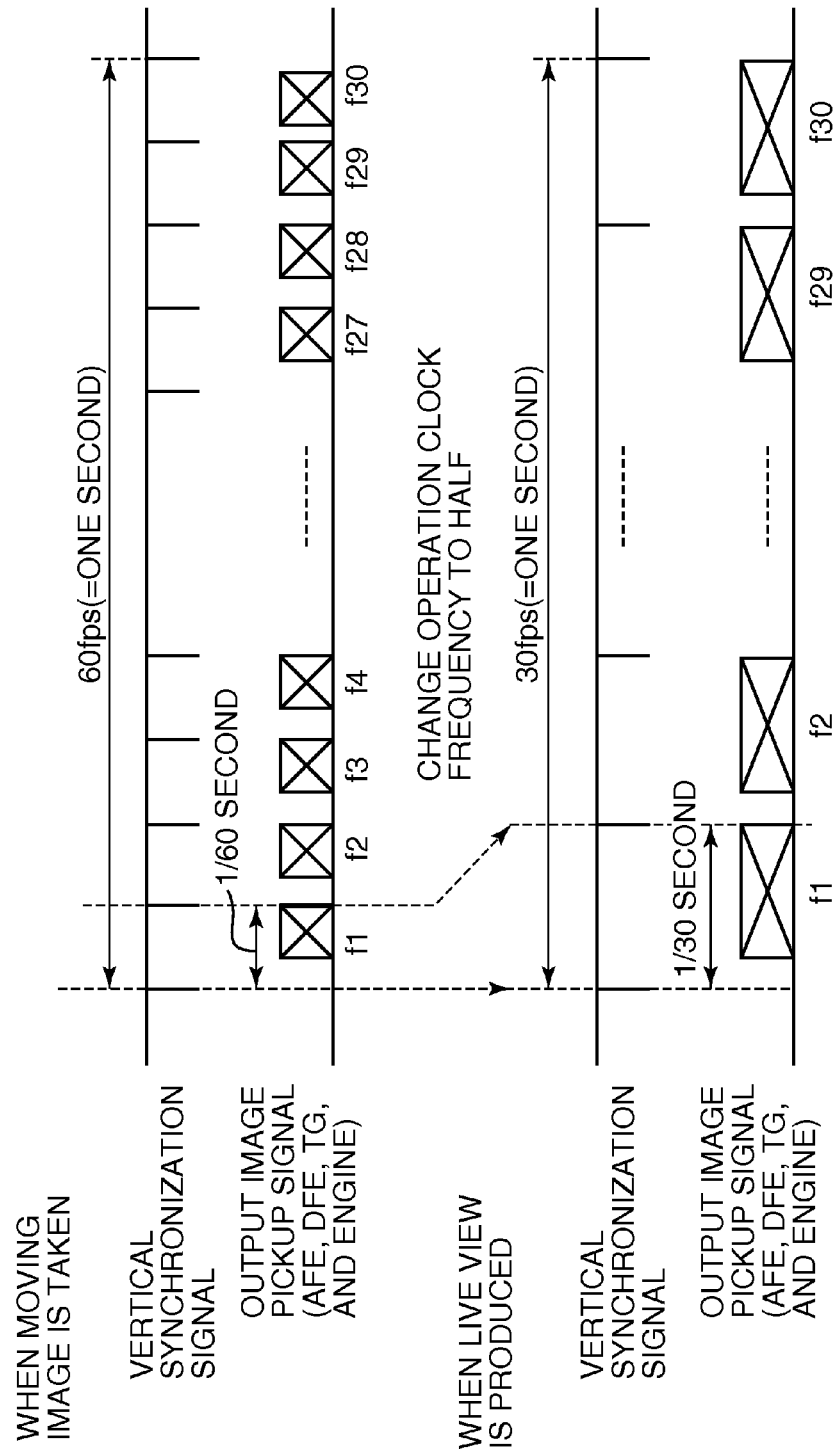

IMAGE PICKUP APPARATUS THAT CAN REDUCE POWER CONSUMPTION

BACKGROUND OF THE INVENTION

1. Field of the Invention

The present invention relates to an image pickup apparatus that is capable of taking high-resolution moving images such as high-definition moving images.

2. Description of the Related Art

With regard to image pickup apparatuses capable of taking high-definition moving images, there is a growing need for increased resolution and operation speed in taking still images and moving images. However, the increases in resolution and operation speed would result in an increase in power consumption of an image pickup apparatus, and it is thus difficult to increase recordable time and the number of still images taken due to heat generation of the apparatus and limitations on a capacity of a battery.

Referring to FIGS. 7 and 8, a description will be given of an exemplary conventional image pickup apparatus capable of taking high-definition moving images.

Referring to FIG. 7, an image pickup device 101 produces outputs in a four-channel split output form. AFEs 103 convert analog video signals of respective channels outputted from the image pickup device 101 into respective digital image signals.

For readout at a resolution and a frame rate that can realize high-definition moving image quality, an extremely high operation clock frequency is required. To lower a readout operation frequency per channel to a readout speed that can be realized by the image pickup device 101 with respect to the operation clock frequency that is increased to realize the high-definition moving image quality, the image pickup device 101 produces outputs in the four-channel split output form.

DFEs 104 are digital signal processing circuits that receive outputs from the AFEs 103 and correct for FTN (fixed pattern noise such as line scratches and distortions) included in the outputs from the image pickup device 101. Each of the outputs from the AFEs 103 and the DFEs 104 is a 10-bit parallel digital output.

PS circuits (parallel-serial conversion circuits) 105 convert the 10-bit parallel digital outputs from the DFEs 104 into respective serial digital signals, and outputs the same at low voltage in a differential manner.

An engine 116 receive the outputs of the respective channels from the PS circuits 105, and integrates and combines the split image pickup signals to create a file such as a still image or a moving image in such a form as to be transferred to and from a computer and generate a video signal that can be displayed on a display unit or the like.

A TG (timing generator) 102 generates pulses that synchronize and drive the image pickup device 101, the AFEs 103, the DFEs 104, the PS circuits 105, and the engine 116.

A CPU 115 controls operation of the image pickup device 101, the AFEs 103, the DFEs 104, the PS circuits 105, the engine 116, and the TG 102 using a control signal 117.

FIG. 8 is a diagram useful in explaining operation timing in a case where recording of a moving image is carried out, and a case where a live view display of a subject is produced in the image pickup apparatus shown in FIG. 7.

In the case where recording of a moving image is carried out, the CPU 115 instructs the image pickup device 101, the AFEs 103, the DFEs 104, the PS circuits 105, the engine 116, and the TG 102 to make a transition to a moving image recording operation mode using the control signal 117.

Upon making a transition to the moving image recording operation mode, the TG 102 generates a vertical synchronization signal VD at a speed of 60 fps (60 times per second). In accordance with a control signal 118 including the vertical synchronization signal VD generated by the TG 102, the image pickup device 101, the AFEs 103, the DFEs 104, the PS circuits 105, and the engine 116 read out and process field image signals of 60 frames per second in synchronization with the vertical synchronization signal VD. Here, it is assumed that image signals of one field constitute one frame.

On the other hand, in the case where a live view display is produced, the CPU 101 instructs the image pickup device 101, the AFEs 103, the DFEs 104, the PS circuits 105, the engine 116, and the TG 102 to make a transition to a live view operation mode using the control signal 117.

Upon making a transition to the live view operation mode, the TG 102 reduces the speed of the vertical synchronization signal VD to a speed of 30 fps (30 times per second) by changing the operation clock frequency to a half frequency as compared with that in the moving image recording mode.

The image pickup device 101, the AFEs 103, the DFEs 104, the PS circuits 105, and the engine 116 read out and process field image signals of 30 frames per second in synchronization with the vertical synchronization signal VD.

In the above described way, in the live view operation mode of which continuous operating time is the longest, power consumption is reduced by switching the operation clock frequency to a half frequency as compared with that in the moving image recording mode so that the heat generation of the apparatus as a whole and the consumption of a battery can be reduced.

However, in blocks that handle analog signals such as the image pickup device 101 and the AFEs 103, there is a large proportion of electric circuits that constantly consume electrical power such as bias electric current irrespective of operation clock frequency. For this reason, even when the operation clock frequency is reduced to half in the live view operation mode, power consumption of the main body of the apparatus is not reduced to half, but is only reduced by about 15% under normal conditions.

Moreover, because the image pickup apparatus has become to use four channels so as to take high-definition images, an apparatus scale required for parallel processing quadruples, resulting in a considerable increase in power consumption, while the percentage of power consumption by the analog signal processing blocks is gradually increasing.

On the other hand, there has been proposed a technique to reduce power consumption of an image pickup apparatus by intermittently driving the image pickup apparatus according to a frame rate required for transmission (Japanese Laid-Open Patent Publication (Kokai) No. H11-168770).

It can be considered to reduce power consumption of the image pickup apparatus in the live view operation mode by intermittently shutting off power to the analog signal processing blocks such as the image pickup device 101 and the AFEs 103 using the above technique described in Japanese Laid-Open Patent Publication (Kokai) No. H11-168770.

However, because of limitations on communication speed, it is technically difficult for the CPU 115 to provide operation mode switching control and electrical power control for the image pickup device 101, the AFEs 103, the DFEs 104, the PS circuits 105, the engine 116, and the TG 102 on a frame-by-frame basis at high speed.

SUMMARY OF THE INVENTION

The present invention provides an image pickup apparatus that can reduce power consumption of the image pickup apparatus, and take high-definition moving images at high speed without bringing about decreases in recordable time and the number of still images taken.

Accordingly, in a first aspect of the present invention, there is provided an image pickup apparatus comprising an image pickup processing unit adapted to be operated in a plurality of operation modes, and have an image pickup device and a plurality of processing units that process image pickup signals outputted from the image pickup device, an interval control unit adapted to provide switching control to switch the image pickup processing unit between a standby ON state and a standby OFF state in predetermined timing, and a system control unit adapted to output a control signal to the interval control unit according to an operation mode of the image pickup processing unit, wherein in a case where the operation mode of the image pickup processing unit is a predetermined operation mode, the system control unit outputs a control signal to the interval control unit so as to cause the interval control unit to carry out the switching control.

According to the present invention, power consumption can be reduced, and high-definition moving images can be taken at high speed by the image pickup apparatus without bringing about decreases in recordable time and the number of still images taken.

Further features of the present invention will become apparent from the following description of exemplary embodiments (with reference to the attached drawings).

BRIEF DESCRIPTION OF THE DRAWINGS

FIG. 7 is a block diagram useful in explaining an image pickup processing unit of a conventional image pickup apparatus.

FIG. 8 is a diagram useful in explaining operation timing of the image pickup processing unit shown in FIG. 7.

DESCRIPTION OF THE EMBODIMENTS

The present invention will now be described in detail with reference to the drawings showing embodiments thereof.

Figure 1:
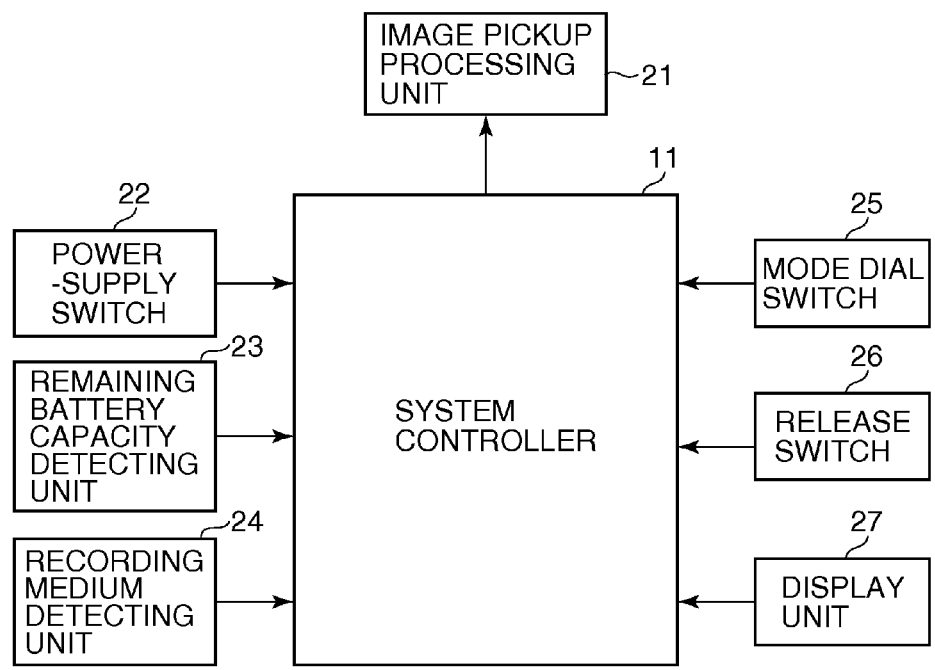
FIG. 1 is a block diagram useful in explaining an image pickup apparatus according to a first embodiment of the present invention.

FIG. 1 is a block diagram useful in explaining an image pickup apparatus according to a first embodiment of the present invention.

Referring to FIG. 1, the image pickup apparatus according to the present embodiment is constructed such that an image pickup processing unit 21, a power-supply switch 22, a remaining battery capacity detecting unit 23, a recording medium detecting unit 24, a mode dial switch 25, a release switch 26, and a display unit 27 are connected to a system controller 11.

The system controller 11 controls the overall operation of the image pickup apparatus. The image pickup processing unit 21 is driven in a plurality of operation modes, and has an image pickup device and a plurality of processing units that process image pickup signals outputted from the image pickup device. The image pickup processing unit 21 generates electric still images and moving images from optical images of a subject.

The remaining battery capacity detecting unit 23 detects the presence or absence of a battery loaded, and a remaining battery capacity. The recording medium detecting unit 24 detects the presence or absence of a recording medium such as a memory card loaded, and a remaining recording capacity.

The mode dial switch 25 is a switch for detecting an operation mode for taking sill images and various moving images. The release switch 26 is a switch for instructing to start operation of a still image or a moving image. The display unit 27 displays various kinds of status information on the apparatus and captured images.

Figure 2:
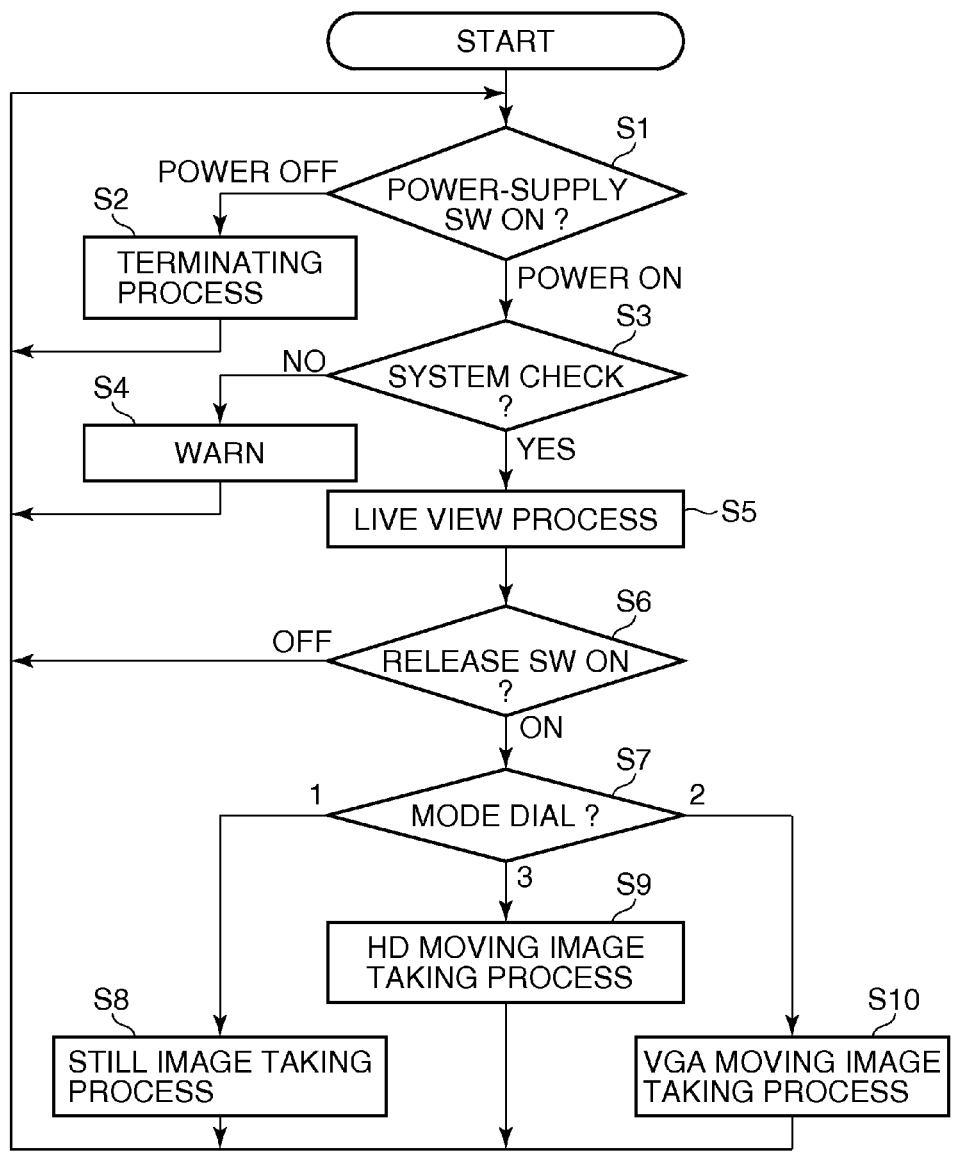
FIG. 2 is a flowchart useful in explaining a process carried out in making a transition to live view display of a subject and recording of still images and various moving images.

Referring next to FIG. 2, a description will be given of processes carried out in making a transition to live view display of a subject and recording of still images and various moving images in the image pickup apparatus constructed as described above. The processes in FIG. 2 are executed by loading a program stored in a ROM, not shown, or the like, and executing the program by a CPU or the like of the system controller 11.

In step S1, the system controller 11 determines whether the power-supply switch 22 is on or off, and when the power-supply switch 22 is off, the system controller 11 proceeds to step S2, and when the power-supply switch 22 is on, the system controller 11 proceeds to step S3.

In the step S2, the system controller 11 brings the display unit 27 into an end status, carries out a predetermined termination process such as shutdown of unnecessary power supply to various components of the apparatus, and then returns to the step S1.

In the step S3, the system controller 11 determines whether or not there is any problem in operating conditions by causing the remaining battery capacity detecting unit 23 to check the remaining battery capacity, and causing the recording medium detecting unit 24 to check the presence or absence of a recording medium loaded, and the remaining recording capacity.

When there is any problem in operating conditions, the system controller 11 proceeds to step S4, and when there is no problem in operating conditions, the system controller 11 proceeds to step S5.

In the step S4, the system controller 11 displays a warning in a predetermined manner via an image or sound using the display unit 27, and then returns to the step S1.

In the step S5, the system controller 11 controls the image pickup processing unit 21 to execute a live view display process.

Specifically, the system controller 11 drives the image pickup device of the image pickup processing unit 21 in a finder mode in which the number of readout pixel signals is reduced to a number suitable for finder display through line thinning, line addition, or the like so as to set a rate required for a finder moving image.

Then, the system controller 11 sequentially displays image data read out and created by the image pickup processing unit 21 as finder images on the display unit 27, and proceeds to step S6.

In the step S6, the system controller 11 determines whether or not the release switch 26 has been depressed, and when the release switch 26 has not been depressed, the system controller 11 returns to the step S1, and when the release switch 26 has been depressed, the system controller 11 proceeds to step S7.

In the step S7, the system controller 11 detects an operated position of the mode dial switch 25, and when the mode dial switch 25 is at a position for a still image taking mode, the system controller 11 proceeds to step S8, and when the mode dial switch 25 is at a position for a high-definition moving image taking mode (HD moving image taking mode), the system controller 11 proceeds to step S9. When the mode dial switch 25 is at a position for a VGA moving image taking mode, the system controller 11 proceeds to step S10.

In the step S8, the system controller 11 controls the image pickup processing unit 21 to complete a predetermined still image taking process, and then returns to the step S1.

In the step S9, the system controller 11 controls the image pickup processing unit 21 to complete an HD moving image taking process for a predetermined time period, and then returns to the step S1.

In the step S10, the system controller 11 controls the image pickup processing unit 21 to complete a VGA moving image taking process for a predetermined time period, and then returns to the step S1.

Here, HD moving images mean high-definition and high-frame-rate (1080 p, 60 fps) moving images, and VGA moving images mean moving images with a standard image size (640×480) and a standard frame rate (30 fps).

Figure 3:
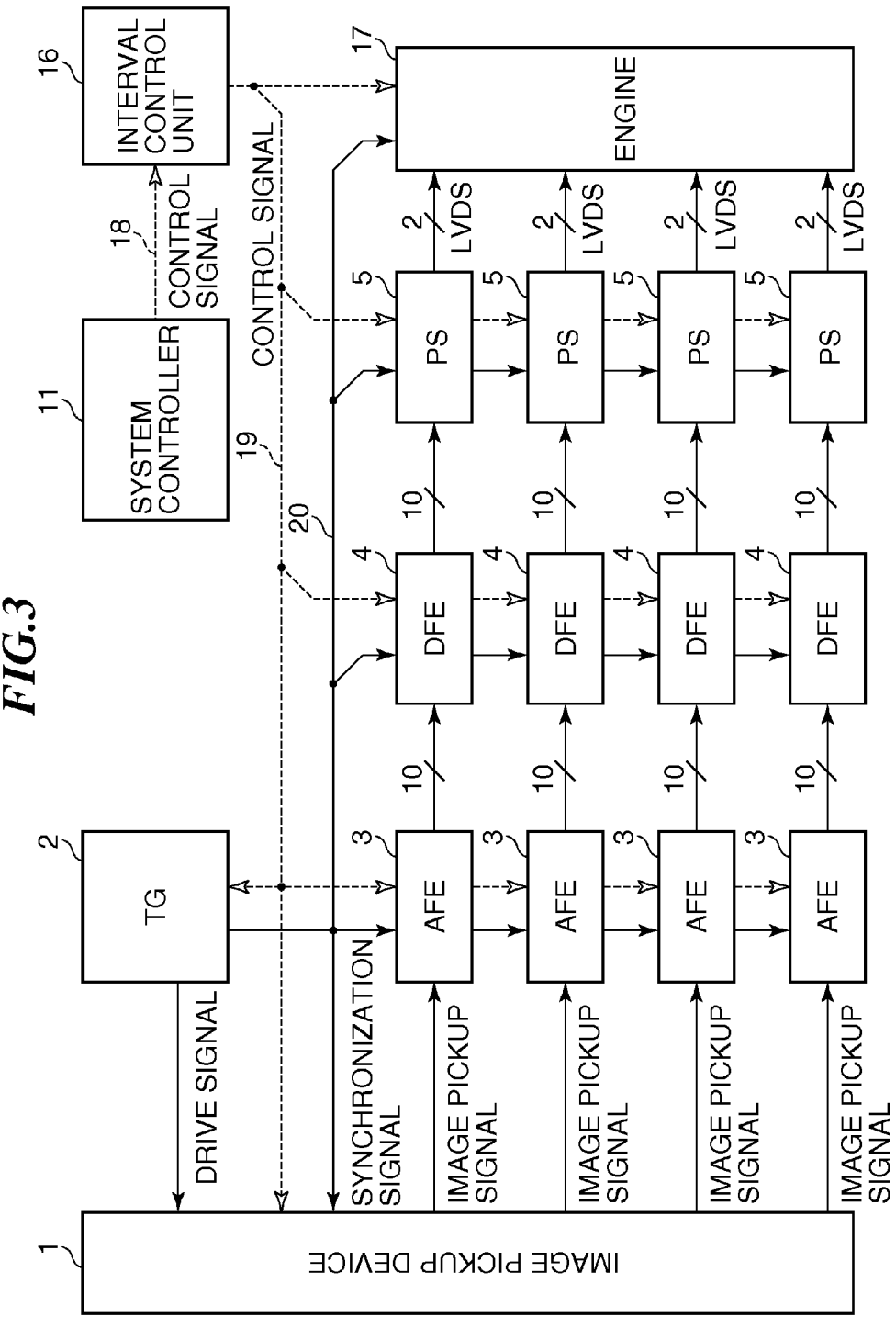
FIG. 3 is a block diagram useful in explaining in detail an image pickup processing unit.

Referring next to FIG. 3, a detailed description will be given of the image pickup processing unit 21.

Referring to FIG. 3, the image pickup device 1 produces outputs in a four-channel split output form, and converts an optical image of a subject into an electric signal. AFEs 3 are signal processing circuits that converts analog video signals of respective channels outputted from the image pickup device 1 into respective digital image signals.

To lower a readout operation frequency per channel to a readout speed that can be realized by the image pickup device 1 with respect to the operation clock frequency that is increased to realize the high-definition moving image quality, the image pickup device 1 produces outputs in the four-channel split output form.

DFEs 4 are digital signal processing circuits that receive outputs from the AFEs 3 and correct for FTN (fixed pattern noise such as line scratches and distortions) included in the outputs from the image pickup device 1. The AFEs 3 and the DFEs 4 each output 10-bit parallel digital signals.

PS circuits 5 are parallel-serial conversion processing circuits that convert 10-bit parallel digital outputs from the DFEs 4 into serial digital signals, and output the same at low voltage in a differential manner.

An engine 17 receives the outputs of the respective channels from the PS circuits 5 and integrates and combines the split image pickup signals to create a file such as a still image or a moving image in such a format as to be transferred to and from a computer and generate a video signal that can be displayed on the display unit 27.

A TG (timing generator) 2 generates pulses that synchronize and drive the image pickup device 1, the AFEs 3, the DFEs 4, the PS circuits 5, and the engine 17.

An interval control circuit 16 changes operation modes of the image pickup device 1, the AFEs 3, the DFEs 4, the PS circuits 5, the engine 17, and the TG 2 using a control signal 19 during intervals. The system controller 11 changes operation modes of the interval control circuit 16 using a control signal 18.

Figure 4:
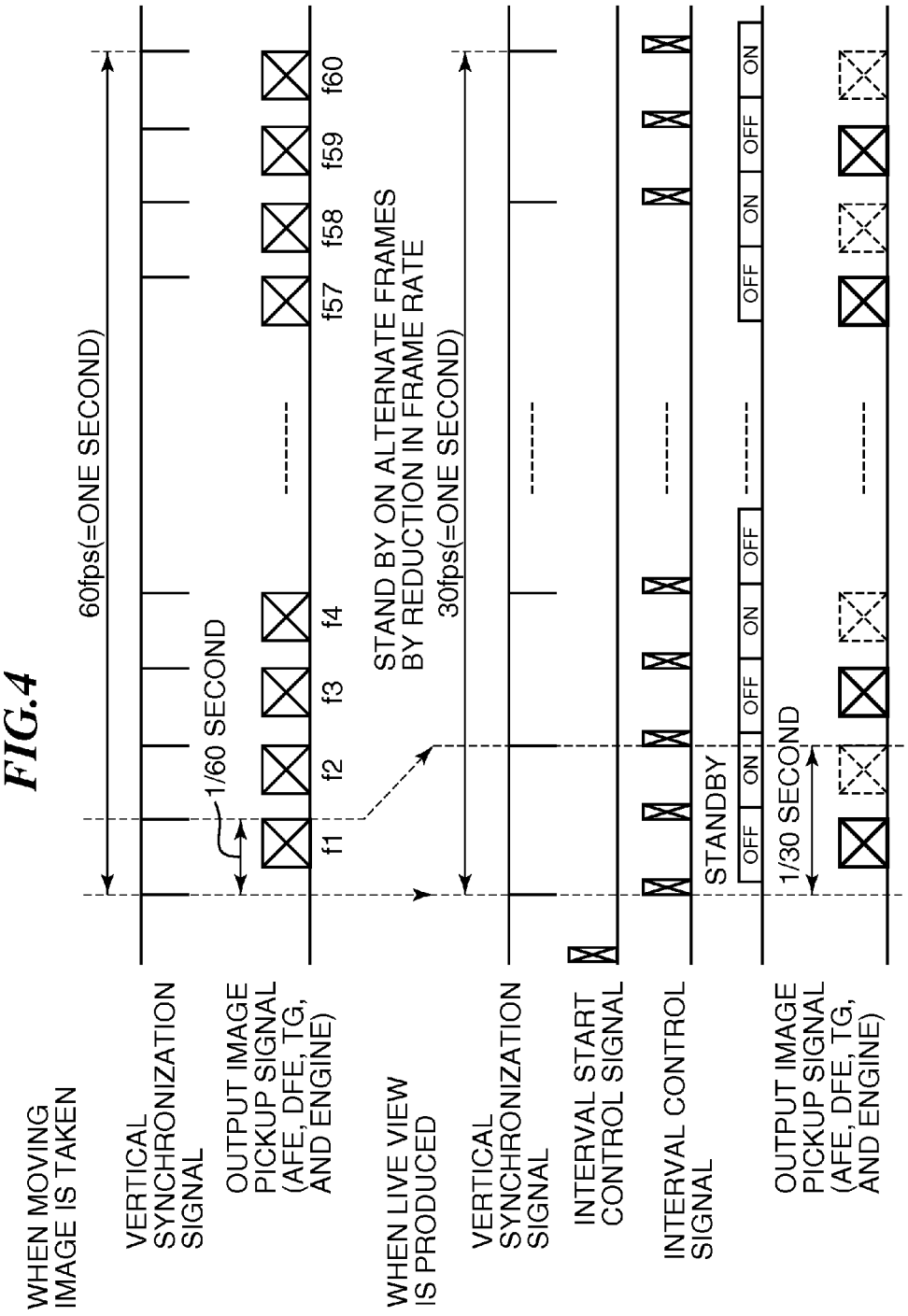
FIG. 4 is a diagram useful in explaining operation timing in a case where an HD moving image taking process is carried out, and a case where a subject live view display process is carried out in the image pickup apparatus shown in FIGS. 1 and 3.

FIG. 4 is a diagram useful in explaining operation timing in a case where an HD moving image taking process is carried out, and a case where a subject live view display process is carried out in the image pickup apparatus shown in FIGS. 1 and 3.

In the case where the HD moving image taking process is carried out, the system controller 11 instructs the interval control circuit 16 to make a transition to an HD moving image taking operation mode.

In response to the instruction from the system controller 11 to make a transition to the HD moving image taking operation mode, the interval control circuit 16 instructs the image pickup device 1, the AFEs 3, the DFEs 4, the PS circuits 5, the engine 17, and the TG 2 individually to make a transition to the HD moving image taking operation mode. As a result, the image pickup device 1, the AFEs 3, the DFEs 4, the PS circuits 5, the engine 17, and the TG 2 make a transition to the HD moving image taking operation mode.

Upon making a transition to the HD moving image taking operation mode, the TG 2 generates a vertical synchronization signal VD at a speed of 60 fps (60 times per second).

The image pickup device 1, the AFEs 3, the DFEs 4, the PS circuits 5, and the engine 17 read out and process field image signals of 60 frames per second in synchronization with the vertical synchronization signal VD. It should be noted that in the present embodiment, it is assumed that image signals of one field constitute one frame.

On the other hand, in the case where the live view display process is carried out, the system controller 11 instructs the interval control circuit 16 to make a transition to a live view operation mode, and generates an interval start control signal.

In response to the instruction from the system controller 11 to make a transition to the live view operation mode, the interval control circuit 16 instructs the image pickup device 1, the AFEs 3, the DFEs 4, the PS circuits 5, the engine 17, and the TG 2 individually to make a transition to the live view operation mode. As a result, the image pickup device 1, the AFEs 3, the DFEs 4, the PS circuits 5, the engine 17, and the TG 2 make a transition to the live view operation mode.

Also, in response to the interval start control signal from the system controller 11, the interval control circuit 16 generates interval control signals of respective fields to the image pickup device 1, the AFEs 3, the DFEs 4, the PS circuits 5, the engine 17, and the TG 2 individually.

The interval control signals are control signals that instruct the image pickup device 1, the AFEs 3, the DFEs 4, the PS circuits 5, the engine 17, and the TG 2 to go into a standby ON state and a standby OFF state alternately on a field-by-field basis.

In accordance with the interval control signals, the image pickup device 1, the AFEs 3, the DFEs 4, the PS circuits 5, the engine 17, and the TG 2 go into the standby ON state to stop reading out and processing image pickup signals on alternate fields. As a result, the frame rate is reduced to a half frame rate (30 fps) as compared with the frame rate during the HD moving image taking operation.

Because in the standby ON state, the image pickup device 1, the AFEs 3, the DFEs 4, the PS circuits 5, the engine 17, and the TG 2 stop reading out and processing image pickup signals, power consumption is reduced to approximately 0 as compared with power consumption in the standby OFF state that is a normal state. For this reason, power consumption is reduced to half power consumption approximately proportional to a reduction in frame rate after the HDD moving image taking operation.

As described above, according to the present embodiment, power consumption during the live view display process can be reduced to power consumption approximately proportional to a reduction in frame rate during the HDD moving image process while control loads on the system controller 11 are reduced. As a result, power consumption of the image pickup apparatus can be reduced, and high-definition moving images can be taken at high speed by the image pickup apparatus without bringing about decreases in recordable time and the number of still images taken.

Figure 5:
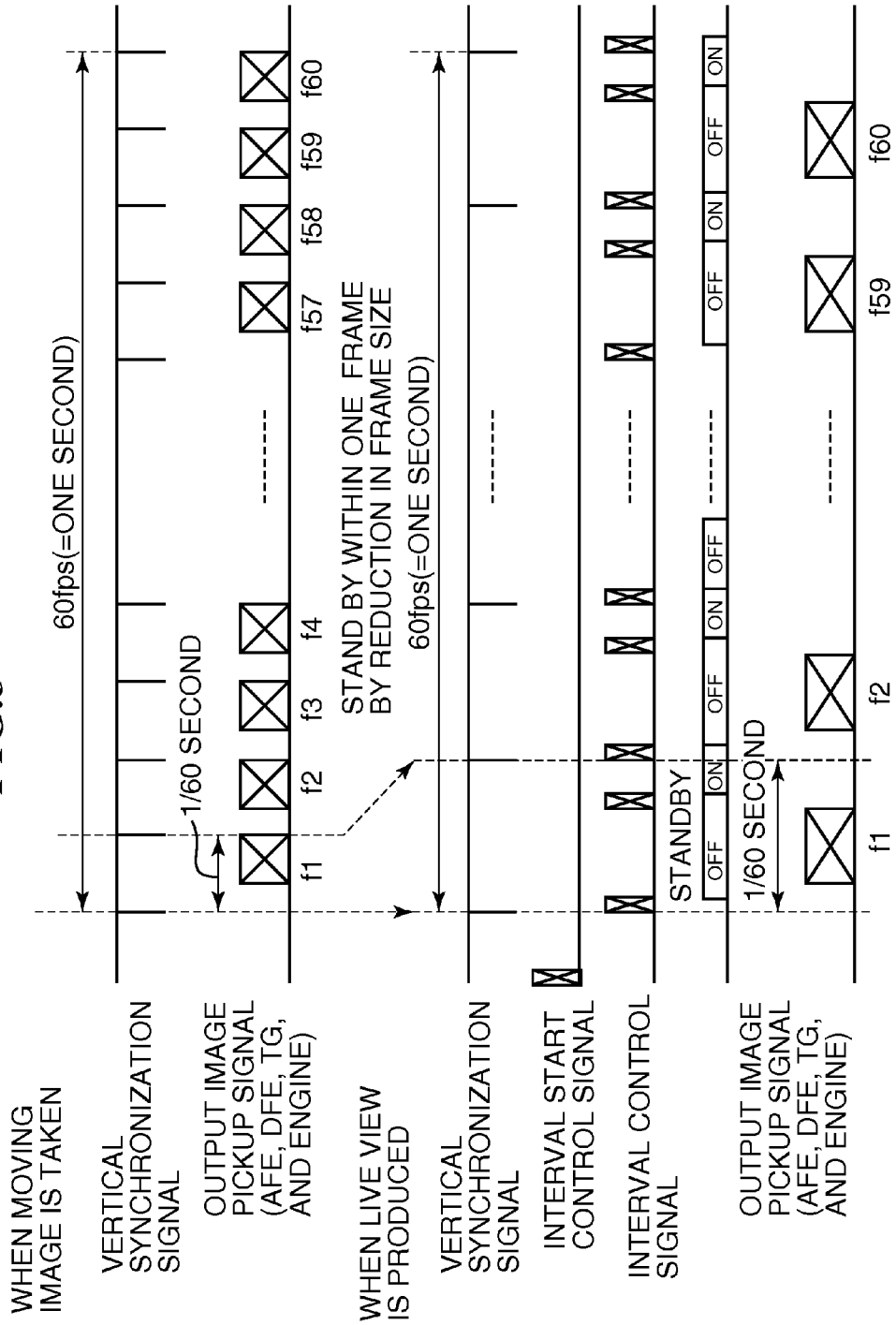
FIG. 5 is a diagram useful in explaining operation timing in a case where an HD moving image taking process is carried out, and a case where a subject live view display process is carried out in an image pickup apparatus according to a second embodiment of the present invention.

Referring next to FIG. 5, a description will be given of an image pickup apparatus according to a second embodiment of the present invention. It should be noted that in the following description, elements and parts which are identical with those of the first embodiment described above are designated by identical reference numerals.

With the mage pickup apparatus according to the present embodiment, a reduction of power consumption is realized by focusing attention to the fact that the frame size can be reduced when the drive mode is switched from the HD moving image taking process to the live view display process.

FIG. 5 is a diagram useful in explaining operation timing in a case where the HD moving image taking process is carried out, and a case where the subject live view display process is carried out in the image pickup apparatus shown in FIGS. 1 and 3.

In the case where the HD moving image taking process is carried out, the system controller 11 instructs the interval control circuit 16 to make a transition to the HD moving image taking operation mode.

In response to the instruction from the system controller 11 to make a transition to the HD moving image taking operation mode, the interval control circuit 16 instructs the image pickup device 1, the AFEs 3, the DFEs 4, the PS circuits 5, the engine 17, and the TG 2 individually to make a transition to the HD moving image taking operation mode. As a result, the image pickup device 1, the AFEs 3, the DFEs 4, the PS circuits 5, the engine 17, and the TG 2 make a transition to the HD moving image taking operation mode.

Upon making a transition to the HD moving image pickup mode, the TG 2 generates a vertical synchronization signal VD at a speed of 60 fps (60 times per second).

The image pickup device 1, the AFEs 3, the DFEs 4, the PS circuit 5, and the engine 17 read out and process field image signals of 60 frames per second in synchronization with the vertical synchronization signal VD. It should be noted that in the present embodiment, it is assumed that image signals of one field constitute one frame.

On the other hand, in the case where the live view display process is carried out, the system controller 11 instructs the interval control circuit 16 to make a transition to the live view operation mode, and generates an interval start control signal.

In response to the instruction from the system controller 11 to make a transition to the live view operation mode, the interval control circuit 16 instructs the image pickup device 1, the AFEs 3, the DFEs 4, the PS circuits 5, the engine 17, and the TG 2 individually to make a transition to the live view operation mode. As a result, the image pickup device 1, the AFEs 3, the DFEs 4, the PS circuits 5, the engine 17, and the TG 2 make a transition to the live view operation mode.

In general, there are no practical problems if the frame size of a live view image to be display on the display unit 27 is significantly smaller than the frame size of an image during HD moving image taking. Thus, when the frame rate is the same, image pickup signals within one field can be read out in a shorter time period.

For this reason, in the present embodiment, control is provided to switch between the standby ON state and the standby OFF state so that standby is OFF in a time period for which image pickup signals within one field are read out, and standby is ON in a time period from the completion of the readout to the start of readout of the next field.

In response to the interval start control signal from the system controller 11, the interval control circuit 16 generates an interval control signal twice for each field to the image pickup device 1, the AFEs 3, the DFEs 4, the PS circuit 5, the engine 17, and the TG 2 individually.

The interval control signal is a control signal that instructs the image pickup device 1, the AFEs 3, the DFEs 4, the PS circuits 5, the engine 17, and the TG 2 to switch between the standby ON state and the standby OFF state within one field.

In accordance with the interval control signal, the image pickup device 1, the AFEs 3, the DFEs 4, the PS circuits 5, the engine 17, and the TG 2 go into the standby ON state to stop reading out and processing image pickup signals for a predetermined time period within one field.

Because in the standby ON state, the image pickup device 1, the AFEs 3, the DFEs 4, the PS circuits 5, the engine 17, and the TG 2 stop reading out and processing image pickup signals, power consumption is reduced to approximately 0 as compared with power consumption in the standby OFF state that is a normal state. For this reason, power consumption is reduced to half power consumption approximately proportional to a reduction in frame rate after the HDD moving image taking operation.

As described above, according to the present embodiment, power consumption during the live view display process can be reduced to power consumption approximately proportional to a reduction in frame rate during the HDD moving image taking process while control loads on the system controller 11 are reduced. As a result, power consumption of the image pickup apparatus can be reduced, and high-definition moving images can be taken at high speed by the image pickup apparatus without bringing about decreases in recordable time and the number of still images taken.

In the above descriptions of the first and second embodiments, it is assumed that control to reduce power consumption is provided in the live view operation mode. However, the same effects can be obtained by the same arrangement in other operation modes insofar as they are predetermined operation modes such as a VGA moving image mode which can reduce the frame rate and the frame size as compared with HD moving images.

Figure 6:
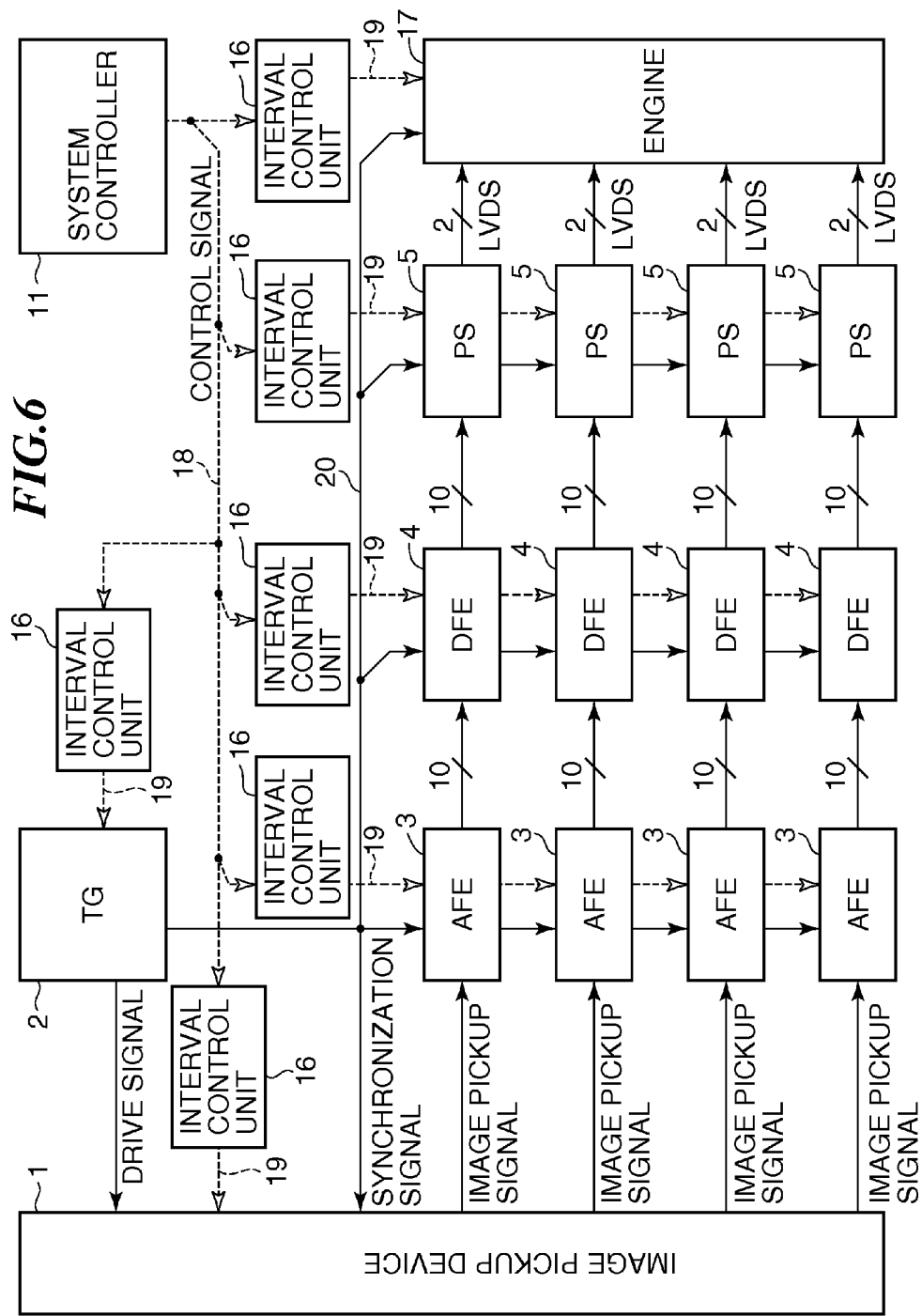
FIG. 6 is a block diagram useful in explaining an image pickup processing unit of an image pickup apparatus according to a third embodiment of the present invention.

Referring next to FIG. 6, a description will be given of an image pickup apparatus according to a third embodiment of the present invention. FIG. 6 is a block diagram useful in explaining an image pickup processing unit of an image pickup apparatus according to the third embodiment of the present invention. It should be noted that in the following description, elements and parts which are identical with those of the first or second embodiment described above are designated by identical reference numerals.

In the image pickup apparatus according to the present embodiment, the image pickup device 1, the AFEs 3, the DFEs 4, the PS circuits 5, the engine 17, and the TG 2 are each provided with the interval control circuit 16 so as to be controlled separately.

Thus, the image pickup device 1, the AFEs 3, the DFEs 4, the PS circuit 5, the engine 17, and the TG 2 can be selectively brought into the standby ON state or the standby OFF state at higher speed while control loads on each interval control circuit 16 are reduced. Other arrangements and operational effects are the same as those in the first or second embodiment described above.

It should be noted that the present invention is not limited to the embodiments described above, but certain changes and modifications may be possible within the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-093104 filed Apr. 7, 2009, which is hereby incorporated by reference herein in its entirety.

What is claimed is:

1. An image pickup apparatus comprising:
an image pickup processing unit adapted to be operated in a plurality of operation modes, and have an image pickup device and a plurality of processing units that process image pickup signals outputted from the image pickup device;
an interval control unit adapted to provide switching control to switch said image pickup processing unit between a standby ON state and a standby OFF state in predetermined timing; and
a system control unit adapted to output a control signal to said interval control unit according to an operation mode of said image pickup processing unit,
wherein in a case where the operation mode of said image pickup processing unit is a predetermined operation mode, said system control unit outputs a control signal to said interval control unit so as to cause said interval control unit to carry out the switching control.

2. An image pickup apparatus according to claim 1, wherein in a case where the operation mode of said image pickup processing unit is an operation mode in which a frame rate or a frame size can be reduced as compared with high-definition moving image taking, said system control unit outputs a control signal to said interval control unit so as to cause said interval control unit to carry out the switching control.

3. An image pickup apparatus according to claim 2, wherein the operation mode is a live view operation mode.

4. An image pickup apparatus according to claim 1, wherein said interval control unit controls said image pickup processing unit to alternately switch between the standby ON state and the standby OFF state on a field-by-field basis.

5. An image pickup apparatus according to claim 1, wherein said interval control unit controls said image pickup processing unit to switch between the standby ON state and the standby OFF state within one field.

6. An image pickup apparatus according to claim 1, wherein said interval control unit is provided in each of the image pickup device and the plurality of processing units.

7. An image pickup apparatus comprising:
an image pickup processing unit adapted to be operated in a plurality of operation modes, and have an image pickup device and a plurality of processing units that process image pickup signals outputted from the image pickup device;
an interval control unit adapted to provide switching control to switch said image pickup processing unit between a standby state and a normal state alternately; and
a system control unit adapted to output a control signal to said interval control unit according to an operation mode of said image pickup processing unit,
wherein in a case where the operation mode of said image pickup processing unit is a predetermined operation mode, said system control unit outputs a control signal to said interval control unit so as to cause said interval control unit to carry out the switching control.

8. An image pickup apparatus according to claim 7, wherein said interval control unit controls said image pickup processing unit to alternately switch between the standby state and the normal state on a field-by-field basis.

9. An image pickup apparatus according to claim 7, wherein the switching control is performed for the image pickup device included in said image pickup processing unit.

10. An image pickup apparatus according to claim 7, wherein the switching control is performed for a timing generator included in said image pickup processing unit.

11. An image pickup apparatus according to claim 7, wherein the switching control is performed for an AFE included in said image pickup processing unit, which converts analog video signals from an image sensor into digital image signals.

12. An image pickup apparatus according to claim 7, wherein the switching control is performed for a DFE included in said image pickup processing unit, which corrects a noise of the image signal.

13. An image pickup apparatus according to claim 7, wherein the switching control is performed for a parallel-serial conversion circuit included in said image pickup processing unit.

14. An image pickup apparatus comprising:
an image pickup processing unit adapted to be operated in a plurality of operation modes, and have an image pickup device and a plurality of processing units that process image pickup signals outputted from the image pickup device;
an interval control unit adapted to provide switching control to switch said image pickup processing unit between a standby state and a normal state alternately; and
a system control unit adapted to output a control signal to said interval control unit according to an operation mode of said image pickup processing unit,
wherein in a case where the operation mode of said image pickup processing unit is a live view operation mode, said system control unit outputs a control signal to said interval control unit so as to cause said interval control unit to carry out the switching control.

15. An image pickup apparatus according to claim 14, wherein said interval control unit controls said image pickup processing unit to alternately switch between the standby state and the normal state on a field-by-field basis.

16. An image pickup apparatus according to claim 14, wherein the switching control is performed for the image pickup device included in said image pickup processing unit.

17. An image pickup apparatus according to claim 14, wherein the switching control is performed for a timing generator included in said image pickup processing unit.

18. An image pickup apparatus according to claim 14, wherein the switching control is performed for an AFE included in said image pickup processing unit, which converts analog video signals from an image sensor into digital image signals.

19. An image pickup apparatus according to claim 14, wherein the switching control is performed for a DFE included in said image pickup processing unit, which corrects a noise of the image signal.

20. An image pickup apparatus according to claim 14, wherein the switching control is performed for a parallel-serial conversion circuit included in said image pickup processing unit.

\* \* \* \* \*